US005774858A

United States Patent [19]
Taubkin et al.

[11] Patent Number: 5,774,858
[45] Date of Patent: Jun. 30, 1998

[54] SPEECH ANALYSIS METHOD OF PROTECTING A VEHICLE FROM UNAUTHORIZED ACCESSING AND CONTROLLING

[76] Inventors: Vladimir L. Taubkin, Lomonosovsky pr 18-12, Moscow, 117296; Valery I. Galoonov, Suvorovskaya 7/2-13, St. Petergof, St. Petersburg 198904, both of Russian Federation

[21] Appl. No.: 546,630

[22] Filed: Oct. 23, 1995

[51] Int. Cl.⁶ ...................................................... G10L 9/06
[52] U.S. Cl. .......................... 704/273; 704/270; 704/274; 704/275
[58] Field of Search .................................. 395/2.82, 2.83, 395/2.84

[56] References Cited

U.S. PATENT DOCUMENTS

| | | | |
|---|---|---|---|
| 4,450,545 | 5/1984 | Kishi et al. | 704/275 |
| 4,501,012 | 2/1985 | Kishi et al. | 704/275 |
| 4,797,924 | 1/1989 | Schnars et al. | 704/275 |
| 4,827,518 | 5/1989 | Feustel et al. | 704/246 |
| 4,827,520 | 5/1989 | Zeinstra | 704/275 |
| 4,837,830 | 6/1989 | Wrench, Jr. et al. | 704/2.38 |
| 4,856,072 | 8/1989 | Schneider et al. | 704/275 |
| 4,961,229 | 10/1990 | Takahashi | 704/246 |
| 4,997,053 | 3/1991 | Drori et al. | 780/287 |
| 5,167,004 | 11/1992 | Netsch et al. | 704/200 |
| 5,214,707 | 5/1993 | Fujimoto et al. | 704/275 |
| 5,265,191 | 11/1993 | McNair | 704/275 |
| 5,293,452 | 3/1994 | Picone et al. | 704/250 |
| 5,303,299 | 4/1994 | Hunt et al. | 379/88 |
| 5,430,827 | 7/1995 | Rissanen | 704/273 |
| 5,438,311 | 8/1995 | Lane | 340/426 |
| 5,499,288 | 3/1996 | Hunt et al. | 379/88 |
| 5,517,558 | 5/1996 | Schalk | 379/88 |
| 5,557,254 | 9/1996 | Johnson et al. | 704/275 |
| 5,559,491 | 9/1996 | Stadler et al. | 340/426 |
| 5,623,539 | 4/1997 | Bassenyemukasa | 379/88 |

FOREIGN PATENT DOCUMENTS

| | | |
|---|---|---|
| 0154020 | 9/1985 | European Pat. Off. . |
| 0407882 | 1/1991 | European Pat. Off. . |
| 0533396 | 3/1993 | European Pat. Off. . |
| 2615152 | 11/1988 | France . |
| 2619065 | 2/1989 | France . |
| 3514241 | 10/1986 | Germany . |
| 3536377 | 4/1987 | Germany . |
| 3536378 | 4/1987 | Germany . |
| 3900494 | 7/1990 | Germany . |
| 4331300 | 3/1995 | Germany . |
| 1453442 | 1/1989 | U.S.S.R. . |
| 1675936 | 9/1991 | U.S.S.R. . |
| WO82/02861 | 9/1982 | WIPO . |
| WO84/03785 | 9/1984 | WIPO . |
| WO87/00234 | 1/1987 | WIPO . |
| WO92/17863 | 10/1992 | WIPO . |
| WO93/02897 | 2/1993 | WIPO . |
| WO93/17895 | 9/1993 | WIPO . |
| WO93/22164 | 11/1993 | WIPO . |
| WO95/17746 | 6/1995 | WIPO . |

*Primary Examiner*—David R. Hudspeth
*Assistant Examiner*—Michael N. Opsasnick
*Attorney, Agent, or Firm*—Rader, Fishman & Grauer PLLC

[57] ABSTRACT

A speech analysis method of protecting a vehicle from unauthorized accessing and controlling has a mode of voice changing and a mode of changing a protection degree. In the voice changing mode, a system realizing the method is interactively entered in advance a voice password, voice service passwords including a voice changing mode service password, and control commands. The passwords and commands are analyzed in a voice dependent and voice independent modes and stored. Then, the voice changing mode service password is entered into the system the system, is taught the passwords and commands in the voice changing mode and transferred in an operational state. In the mode of changing protection degree, after the passwords and commands, including a voice service password for changing a system protection degree, are interactively entered into the system in advance, the protection degree is changed through interactively entering the protection degree service password the system is taught the password and the commands at the changed protection degree and transferred into the operational state.

4 Claims, 8 Drawing Sheets

SPEECH ANALYSIS METHOD OF PROTECTING A VEHICLE FROM UNAUTHORIZED ACCESSING AND CONTROLLING

BACKGROUND OF THE INVENTION

1. Field of the Invention

The present invention relates to security systems, and more specifically to methods and systems of protection of various objects, for example vehicles, by preventing unauthorized persons from accessing and controlling the objects. Still more specifically, the present invention relates to anti-car-theft methods and systems using remotely controlled protection means based on automatic speech analysis.

2. Prior Art

Known in the art are a method and an apparatus for a remote control of one or a plurality of functions of a vehicle with the use of a coded signal portable transmitter and a receiver placed in the vehicle (car). The receiver compares the received coded signal with that stored in the receiver and thereby determines the significance of the code, to activate a security means. To enhance protection, the transmission of two coded signals from two portable transmitters differently acting on the security means is used (PCT, 93/17895).

One drawback associated with prior art systems is that if unauthorized access is attempted, the transmitter code signals in such a system can be simulated (mimicked) by, for instance, a specialized scanner. This is a critical weakness, and forms a limitation in the ultimate protection that can be afforded with such a system. Besides, the portable transmitter can be stolen and used for a subsequent stealing of the vehicle.

A similar system for protecting vehicles is known using a multichannel remote transmitter and a receiving unit coupled via a controller with actuators of the steering wheel and driver's seat. The vehicle can be brought into operation after an authorizing signal is transmitted and received that unlocks the actuators (U.S. Pat. No. , 4,997,053).

Also known is an automobile protection apparatus in which an input element is installed on the inner side of the hood, trunk lid, or window of a vehicle (PCT, 82/02861). The input element is provided with radiation-sensitive switches actuated by a code element from outside, the input element being subjected to a variation of an external source radiation or field. Coupled with a door are elements of audible and visual alarm.

The apparatus can detect attempts of penetration into a locked automobile. However, it suffers from the limitations of the above prior art units inasmuch as it is vulnerable to simulation of the code element signals.

An electronic locking system in lock-and-key form has been made use of, the key having a built-in transmitter cooperating with a receiver placed in the lock (PCT, 87/00234). The receiver is coupled with an electronic assembly recording the code signal. In this particular case, however, signals from the transmitter in the key can be equally easily mimicked from an external source that does not allow a sufficient degree of protection to be achieved. In addition, the key can be stolen and used for stealing a vehicle.

Also known is a vehicle protection system in which protection components are exposed to a radio frequency signal from a portable module made, for example, in ignition key form (PCT, 93/02897). In an effort to enhance the degree of protection, the power supply is connected to the portable module upon its mounting, and a radio frequency code signal generated over the second path inside the vehicle causes the protection components to turn off the respective protection actuators. However, in this case, too, the code signals can be mimicked by means of an external source that leads to an unauthorized controlling of the vehicle protection components.

To enhance reliability of protection, a protection apparatus for controlling a vehicle and identifying its owner has been provided. The apparatus uses a radiation element with a keyboard and several radiation elements, with a button each, emitting digital code signals received by a receiver in the vehicle. Then, the apparatus ascertains the genuineness of the signals identifying the vehicle owner (FR, 2615152). A code can be generated for the purpose of the identification and verification of the vehicle owner's personality. A portion of the code is placed on the vehicle and made indelible. Another portion of the code is entered onto the card carried by the owner, the both code portions being stored in a memory of a car. A processor performs a convolution of the two code portions and makes the decision of whether the identification has happened (FR, 2619065). And yet, the use of the radiation elements and code generators features the above shortcomings, and the personality identification codes in themselves can be easily imitated for an unauthorized access.

The kindred systems have been put forward by Bayerische Motoren Werke AG, Munich, Germany. They also use remote transmitters (for instance, in key form) and receivers or an interrogator-responder placed on a car that provide the actuating of protection components or confirm the authorized access thereto (DE, 3536377; DE, 3536378; and DE, 3900494). The trouble with these systems lies in a possibility to mimic the remote transmitters that results in a lower protection degree upon unauthorized access. Besides, a thief can readily make use of the stolen remote transmission means to get an unauthorized access to a guarded object.

Known also is the use of identification cards with a programmable module that are to be plugged in a control unit and authorize various operations of checking and setting, unlocking vehicle protection components in the control unit, etc. (PCT, 84/03785). However, the identification cards being the mechanical carriers of information are not adequately mimic-proof. In addition, they can be lost by a user or stolen from him (her), or otherwise expropriated, and unauthorized persons can utilize the found or stolen cards.

An object security system, specifically for vehicles, has been provided comprising a remote transmission unit and a receiving unit mounted on a vehicle (PCT, 92/17863, or PCT, 93/22164). By virtue of a dedicated controller, the receiving unit is coupled with actuators and a warning signal module. According to a stored program, generators of the transmission unit form one or more pseudo-random code sequences and an identification code that are transmitted to a receiving side to be compared with a pseudo-random code and an identification code stored at the receiving side to generate a command signal to the controller to control a memory unit and the receiving unit, as well as the actuators and the warning signal module. Since the codes at the transmission and the receiving sides change at all times, particular difficulties emerge upon an unauthorized access to actuators of the guarded vehicle.

However, the coded messages generated by transmission units of these security systems also are not user-specific (vehicle-owner-specific, for instance) and can eventually be mimicked or scanned from an external source, with the result in lowering the degree of protection of guarded objects. Besides, wrongdoers can make use of stolen transmission units.

Known also have been fairly many suggestions aimed at using speech control of various systems of a vehicle, without identification of the user's personality (U.S., Pat. No. 4,797,924, or U.S., Pat. No. 5,214,707). However, many of the above-listed limitations are typical of these systems as well.

The drawbacks of the described systems can be eliminated through introducing a procedure of identification or verification of an authorized user where user's individual, personal parameters (for example, physiological parameters) such as voice and speech that are user-specific and user-inseparable are made use of.

In a number of technical areas, use has been already made of "voice keys" providing for an authorized access of the definite persons to data banks, special purpose apparatus (RU, 1453442; RU, 1675936), and to telecommunication channels (EPO, 0533396; U.S. Pat. No. 4,837,830).

The apparatus known in the art identify a user by his (her) voice and generate some characteristic parameters while user is pronouncing a standard sentence. The parameters are then compared with average quantities stored in the internal memory (EPO, 0154020). The comparison yields a current value showing the probability of that the sentence has been pronounced by an authorized user, the current value being compared with a threshold value. The apparatus holds the user to have been verified provided the current value exceeds the threshold value.

Systems have been also known in which voice prints of an authorized user are stored on special-purpose cards (U.S. Pat. No. 4,961,229; or U.S. Pat. No. 4,827,518).

Finally, a voice activated vehicle security system has been suggested (U.S. Pat. No. 4,856,072) that can be turned on or off based on comparison of passwords pronounced by a user with the prints of the previously entered passwords pronounced by authorized users.

The last mentioned system, as well as the other above-identified prior art systems, that the applicants of the present invention are aware of, which use the procedures of verification based on "voice imprints" of the authorized users, have one common drawback. It resides in insurmountable difficulties in securing an access of an authorized user to the object in the event of a user's voice change that can be caused by sickness or by a change of a psychophysiological state also affecting the voice parameters. More specifically, those systems cannot adapt to individual voice variability. This is very critical for a verification subsystem in a car where the authorized user is most likely the master user who must have unimpeded access to the vehicle in addressing the system.

In addition, the last-mentioned prior art system cannot seemingly be adapted to a user desiring to vary the degree of protection of the object or to change decision making thresholds upon verification and command recognition depending on user's possibilities and speech capabilities. Also absent upon an unauthorized access is the voice recordation of the wrongdoer though it may turn out to be significant evidence in the course of searching for the wrongdoers and further legal prosecution. The prior art system is not provided with a means for effective protection against forcible stealing a vehicle (car-jacking). One more flaw of the system in question is having an additional electromechanical means for controlling the system ("train switch").

SUMMARY OF THE INVENTION

1. Objects of the Invention

Accordingly, it is a primary object of the present invention to provide a method of voice actuated protection of a vehicle from unauthorized accessing and controlling and a system for effecting the same.

A more particular object of the invention is to provide a method of and a system for voice actuated protection of a vehicle from unauthorized accessing and controlling that are free from drawbacks of prior art methods and systems.

Further object of the invention resides in providing a method of and a system for voice actuated protection of a vehicle from unauthorized accessing and controlling that are mechanically simple and convenient in operation for an authorized user.

Another object of the invention lies in providing a method of and a system for voice actuated protection of a vehicle from unauthorized accessing and controlling, the method and the system being based upon speech analysis.

Yet another object of the invention consists in providing a method of and a system for voice actuated protection of a vehicle from unauthorized accessing and controlling, the method and the system being effective under the circumstances where the user's voice has changed due to user's sickness or other psychophysiological changes and being adaptable to individual user's voice variability.

Still another object of the invention lays with providing a method of and a system for voice actuated protection of a vehicle from unauthorized accessing and controlling that are capable to secure against forcible stealing a vehicle (car-jacking).

Still further object of the invention involves providing a method of and a system for voice actuated protection of a vehicle from unauthorized accessing and controlling that can afford selecting the desirable degree of protection of a vehicle.

Still yet another object of the invention implies that a method of and a system for voice actuated protection of a vehicle from unauthorized accessing and controlling are provided allowing for registration of the voice of the unauthorized persons attempting to access and control the vehicle.

For a better understanding of the nature and the foregoing and other objects and advantages of the present invention, reference should now be furnished to the ensuing detailed description. In the description, reference is made to the accompanying drawings which form a part thereof and in which, by way of illustration, there are shown preferred embodiments of the invention. Such embodiments, however, do not necessarily represent the full scope of the invention, and the claims are therefore to be addressed for interpreting the scope of the invention.

2. Brief Summary of the Invention

In accordance with the objects formulated in the above, there is provided a multimode system of protection a vehicle, which has warning and locking means and actuators, from unauthorized accessing and controlling. The system is incorporated in the vehicle and comprises a microphone responsive to the voice of a user, a means for generating voice message intended for the user, a user's personality voice verification means, a voice message recognition means, a logic function memory means, a control means, and an initiating means setting the control means. The user's personality voice verification means receives information from the microphone to perform the user's personality verification which is based on both text-dependent and text-independent parameters, and to generate a first plurality of control signals. The voice message recognition means also receives information from the microphone to recognize service passwords and control commands and to generate a second plurality of control signals. The recognition is based on the text-dependent parameters. The logic function memory means stores programs governing performance of the multiple modes of the system and selection of the text-independent and text-dependent parameters. The control means perceives control signals from the first plurality of control signals to generate respective commands to the warning and the locking means. It also perceives control signals from the second plurality of control signals, to select a respective one of the multiple modes, to change the parameters, and to generate commands to the voice message generating means and to the actuators. The selection and the change are based on the programs stored in the logic function memory means.

Preferably, the user's personality voice verification means includes a text-independent extracting means for isolating parameters of speech that are specific for the voice of the user, a text-dependent extracting means for selecting parameters of speech used for the recognition of an utterance of the user, and a first subsystem for the verification of the user's personality. The first subsystem is fed from the text-independent and text-dependent extracting means.

Preferably, the voice message recognition means includes a text-dependent extracting means for selecting parameters of speech used for the recognition of an utterance of the user and a second subsystem for recognizing service passwords and control commands entered by the user. The second subsystem is fed from the text-dependent extracting means.

The initiating means in the multimode system according to the invention includes an ignition key.

The voice message generating means includes a voice message generator connected to a speaker.

The system also may comprise a voice recording means for registering talks in the vehicle in the event of unauthorized access thereto. The voice recording means is fed from the microphone and controlled from the control means.

The actuators of the vehicle may include any one or any combination in a group substantially comprising power windows, power doors, windshield wipers, HVAC, passenger compartment lights, head lights, an ignition means, a vehicle navigation means.

A method of protection a vehicle from unauthorized accessing and controlling according to the present invention uses a multimode system incorporated in said vehicle. The method comprises the steps of initializing the system by the initiating means; generating a voice message to a user by the voice message generating means, requesting a teaching procedure to be begun, and transmitting the message to the user; entering a voice password by the user through the microphone into the system; analyzing the voice password in a text-dependent and a text-independent mode by the user's personality voice verification means and the voice message recognition means controlled by the control means; memorizing the analyzed voice password in the logic function memory means as a password pattern; generating a voice message to the user by the voice message generating means, requesting the teaching procedure to be continued, and transmitting the message to the user; entering a voice service password by the user through the microphone into the system; analyzing the voice service password in a text-dependent mode by the voice message recognition means controlled by the control means; memorizing the analyzed voice service password in the logic function memory means as a service password pattern; generating a voice message to the user by the voice message generating means, requesting the teaching procedure to be further continued, and transmitting the message to the user; entering a voice control command by the user through the microphone into the system; analyzing the control command in a text-dependent mode by the voice message recognition means controlled by the control means; memorizing the analyzed voice control command in the logic function memory means as a control command pattern; generating a voice acknowledgment intended for the user by the voice message generating means, and transmitting the same to the user; and transferring the system into an operational state.

To obtain a higher degree of protection, the entering of the voice password into the system is performed successively a predetermined number of times.

There are a predetermined number of voice service passwords and voice control commands that are successively entered into the system, each of these service passwords and control commands being individually analyzed and memorized therein.

When being used for activating the system, the method of protection a vehicle comprises the steps of initializing the system by the initiating means; generating by the voice message generating means a voice message to a user requesting the voice password to be entered, and transmitting the message to the user; entering a password by the user through the microphone into the system; generating a control signal to the control means actuating a procedure of verification; verifying the user's personality by the voice verification means controlled by the control means, the verifying being based on text-dependent and text-independent speech analysis of the entered password and using a user's voice pattern stored in the logic function memory means; and actuating the warning and locking means and the actuators if the analysis has not shown consistency between the user's voice pattern and the entered password.

For a higher degree of reliability, the entering of the password is performed a predetermined number of times.

On the contrary, if the procedure of the verification resulted in a positive result, a voice acknowledgment intended for a verified user is generated by the voice message generating means and transmitted to the verified user.

Further, a service password is entered by the user through the microphone into the system, a control signal is generated to the control means actuating a procedure of recognizing the entered service password. The procedure is effected by the voice message recognition means controlled by the control means and it is based on text-dependent speech analysis of the entered service password with the use of the service password voice pattern stored in the logic function memory means. Then, a control signal is generated to select a mode of the multiple modes corresponding to the recognized service password, and a voice message to the user is generated in the form of the recognized service password.

Still further, a control command is entered by the user, a control signal is generated to the control means actuating a procedure of the recognizing of the entered control command. The procedure is performed by the voice message recognition means controlled by the control means and it is also based on text-dependent speech analysis of the entered control command, with the use of the control command voice pattern stored in the logic function memory means. After that, a control signal is generated to control an actuator of the actuators corresponding to the recognized control command, and a voice message is generated to the user in the form of the recognized control command.

In realization of an anti-car-jacking protection aspect of the present method, the method comprises the steps of entering a service password corresponding to a car-jacking mode; recognizing this car-jacking service password by the voice message recognition means controlled by the control means, this recognition being based on text-dependent speech analysis of the entered car-jacking service password with the use of the car-jacking service password pattern stored in the logic function memory means; generating a control signal to the control means to select the mode of car-jacking; and actuating the warning and locking means and the actuators.

In another aspect of realizing the anti-car-jacking protection, the method comprises the steps of initializing the system by the initiating means; generating a voice message to a user requesting the voice password to be entered; entering by the user a service password corresponding to the car-jacking mode; recognizing the car-jacking service password by the voice message recognition means controlled by the control means, this recognition being based on text-dependent speech analysis of the entered car-jacking service password using the car-jacking service password pattern stored in the logic function memory means; generating a control signal to the control means to select the mode of car-jacking; and actuating the warning and locking means and the actuators.

The actuating is effected subsequent to elapsing a predetermined period of time from a moment of the entering of the car-jacking service password.

Implementing a specific "Teaching" mode of operating the system aimed at adding users of the system, the method of protection a vehicle according to the present invention involves entering a first particular service password by the verified user, the first particular service password relating to a "Teaching" mode; generating a requesting voice message to the verified user and transmitting this message to the user, and entering a second particular service password by the verified user, this second particular service password representing a selected mode of teaching; entering a voice password by a second user through the microphone into the system; analyzing the second user's voice password in a text-dependent and a text-independent mode by the user's personality voice verification means and by the voice message recognition means controlled by the control means; memorizing the analyzed second user's voice password in the logic function memory means as a second user's password pattern; generating a voice message to the second user by the voice message generating means, requesting the teaching procedure to be continued, and transmitting this message to the second user; entering a voice service password by this second user; analyzing this second user's voice service password in a text-dependent mode by the voice message recognition means controlled by the control means; memorizing the analyzed second user's voice service password in the logic function memory means as a second user's service password pattern; generating a voice message to the second user requesting the teaching procedure to be further continued, and transmitting this message to the second user; repeating all the above operations pertaining to the service password for a voice control command; and transferring the system into an operational state.

In performing a "Valet" mode, the method comprises the steps of entering a third particular service password by the verified user, the third particular service password relating to a "Valet" mode; recognizing the "Valet" service password by the voice message recognition means controlled by the control means based on text-dependent speech analysis of the entered "Valet" service password, with the use of the "Valet" service password pattern stored in the logic function memory means; generating a control signal to the control means to select the "Valet" mode; transferring the system into a state of expectation, with the warning and locking means being locked; entering a fourth particular service password by the verified user, the fourth particular service password relating to cancellation of the "Valet" mode; recognizing the "Valet" cancellation service password by means of the voice message recognition means controlled by the control means, the recognizing being based on text-dependent speech analysis of the entered "Valet" cancellation service password and using the "Valet" service password pattern stored in the logic function memory means; generating a control signal to the control means to cancel the "Valet" mode; and transferring the system into the operational state.

In still another aspect of the method calling for its implementing in cases where the voice of the authorized user suffered changes, the system is initialized by a user by means of the initiating means; a voice message is generated and transmitted to the user requesting the password to be entered; verifying the entered password according the above-described procedure; entering a service password corresponding to a voice changing mode; recognizing the voice changing service password based on the analysis of the entered voice changing service password using the voice changing service password pattern; generating a control signal to the control means to select the mode of voice changing; entering a first particular service password by the user, the first particular service password being related to a "Teaching" mode; generating and transmitting a requesting voice message to the user; entering a second particular service password by the user, the second particular service password representing a selected mode of teaching; entering a voice password by the user; analyzing the user's voice password in a text-dependent and a text-independent mode; memorizing the analyzed user's voice password as this user's second password pattern; generating and transmitting a voice message to the user requesting the teaching procedure to be continued; further entering a voice service password and a control command by the user; analyzing and recognizing these user's voice service password and control command in a text-dependent mode with subsequent memorizing them in the logic function memory means as said user's second service password and second control command patterns; generating a voice acknowledgment intended for the user and transmitting the same to the user; and transferring the system into an operational state.

A voice signal or a sound signal other than a voice signal may be used for entering the service password.

In yet another aspect of the present method aimed at changing a protection degree, the method involves the steps of entering a fifth particular service password by the verified user, the fifth particular service password relating to a "Protection degree" mode; recognizing the "Protection degree" service password based on text-dependent speech analysis of the entered "Protection degree" service password, with the use of the "Protection degree" service password pattern stored in the logic function memory means; generating a control signal to the control means to select the "Protection degree" mode; changing a protection degree in compliance with the "Protection degree" mode; generating and transmitting a voice message to the verified user requesting a teaching procedure to be begun; entering a voice password by the verified user; analyzing the voice password in a text-dependent and a text-independent mode;

memorizing the analyzed voice password as a password pattern in the "Protection degree" mode; and transferring the system into the operational state.

Thus, in accordance with the present invention, the above-mentioned shortcomings and other limitations of the prior art methods and systems are believed to be obviated.

DESCRIPTION OF PREFERRED EMBODIMENTS

Figure 1:
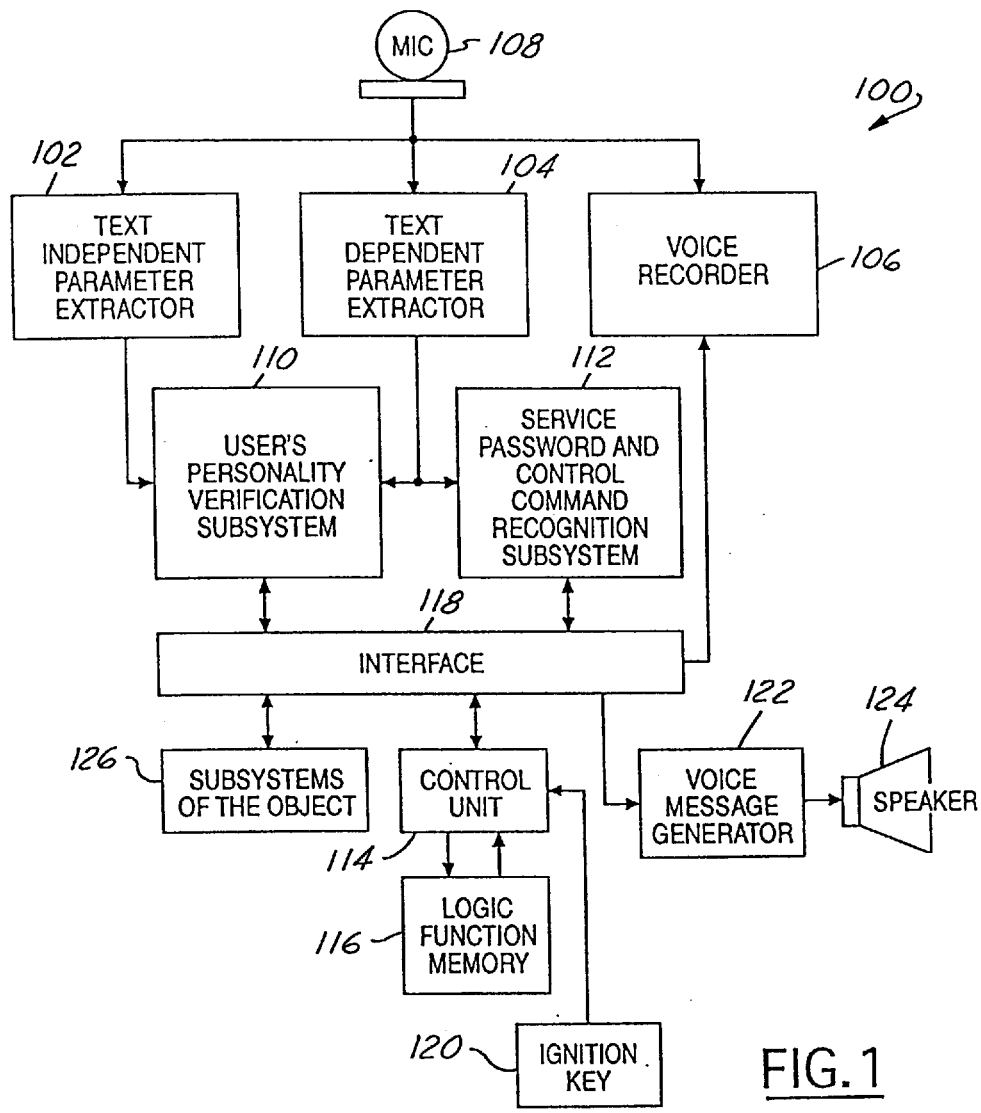
FIG. 1 is a block diagram of a system of protection an object against unauthorized access thereto according to the present invention.

Before describing in detail the particular improved method of and system for voice actuated protection from unauthorized accessing and controlling a vehicle in accordance with the present invention, it should be appreciated that the present invention, specifically as far as the system is concerned, resides primarily in a novel structural combination of conventional electronic circuits and components rather than in the particular detailed configuration thereof. Accordingly, the structure, control and arrangement of these conventional circuits and components have been illustrated in the drawing by a readily understandable block diagram which shows only those specific details that are pertinent to the present invention, so as not to obscure the disclosure with structural details which will be readily apparent to those skilled in the art having the benefit of the description herein. Thus, the block diagram depiction does not necessarily represent the electrical structural arrangement of the exemplary system, but is primarily intended to illustrate the major structural components of the system in a convenient functional grouping, whereby the present invention may be more readily understood.

Referring now to FIG. 1, a system 100 according to the present invention for protection an object (preferably a vehicle) against unauthorized accessing and controlling comprises, among other circuits, a text-independent parameter extractor 102 for verification of a user, a text-dependent parameter extractor 104 for verification of the user and for control purposes, and an unauthorized user voice recorder 106.

From all possible totality of spectrum and time parameters of speech, the extractor 102 isolates only those that in their aggregation are specific for the user's voice and manner of speaking and are text-independent. These parameters can be:

an average main speech tone $F_o$, a range of its deviation, a main tone frequency distribution form or its other characteristics;

an average speech frequency spectrum s(w) of a given announcer within the whole analyses range or subranges thereof, the spectrum S(w) being defined as $$S_k(w) = \frac{\sum_{i=1}^{N} S_k(w_i t_i)}{N}$$

where $S_k(w_i t_i)$—the frequency spectrum at the moment of $t_i$, i=1, ... N—numbers of speech signal time samples, and k is an announcer subscript;

an individual speech rhythm defined as an alternation of tonal and non-tonal portions;

values of individual high-frequency formants $F_i$.

Also, other parameters carrying the information of the speaker individuality can be used for this purpose.

From the above-mentioned totality of speech parameters, the text-dependent parameter extractor 104 selects a set sufficient for the reliable recognition of an utterance (a word or a sentence). These parameters can be, for example, dynamic spectra, i.e. development of the spectra in time, s(w,t), or other dynamic parameters such as development of LPC (for Linear Prediction Coefficients) in time, the recognizable element being a speech command (a word or a word group) as a whole. Also, not only can the parameters specific for the speech password or a speech command as a whole be used, but those parameters as well that are characteristic for separate speech elements such as phonemes or syllables, for instance formant frequencies $F_i$.

The voice recorder 106 serves the purpose of recording talks at the object (in the passenger compartment of the vehicle) in the event of system's ascertaining the fact of unauthorized access thereto.

The units 102, 104, and 106 are input from a microphone 108, and outputs of the extractors 102 and 104 are connected to a user's personality verification subsystem 110. The subsystem 110 makes use of the following three levels of the speaker personality verification.

Firstly, familiarity with passwords is checked. This recognition mode is close to a speaker-independent one. Any speech (word, command) recognition procedures accepted in the Automatic Speech Recognition theory such as DTW (for Dynamic Time Warping), HMM (for Hidden Markov Models), or phoneme-by-phoneme recognition can be used. They are disclosed, for example, in "Speech Recognition" by P. Foster and Th. Schalk, A Telecom Library Inc. Book, 1993.

Secondly, it is using the same procedures mentioned in the above but in a speaker-dependent mode. In so doing, recognition thresholds are narrowed and cut off are users knowing passwords but having differing voices or the manner of pronouncing.

Thirdly, it is defining the speaker's speech-based individuality proper relying on the combination of the text-independent and text-dependent parameters (see the description of the extractors 102 and 104). There is a large amount of those parameters, and the decision is made by polling, the informativeness of the parameters being taken into account. Alternatively, the decision regarding the speaker's individuality can be taken on the threshold model. If, upon teaching (discussed in detail below), an individual parameter, the average main speech tone $F_o$ for instance, takes the value of $F_{ok}$ for a given authorized user k, then it is the parameter values kept within $F_{ok} \pm \Delta F_o$ only (where $\Delta F_o$ is some chosen deviation whose selection will be discussed in more detail immediately below) that will result in conforming the user's authority. Similar rules are applied to other parameters.

The concept of selecting thresholds for user-dependent parameters is generally limited to the following. For some representative voice sampling, the probabilities of the 1st and the 2nd kind of errors are defined as a function of the threshold values, where the error of the 1st kind is letting an unauthorized user in, and the error of the 2nd kind is keeping the authorized one off. Further, for the operational mode, the thresholds are selected in such a way as to provide two conditions:

the required security level (not to let an unauthorized user in), and user's convenience (not to make difficult letting the authorized user in).

Selecting a user-dependent parameter (actually, a group of parameters) for the analysis in the operational mode, the system harnesses the following decision-making logic:

1. The values of the parameters are found so close to those set in teaching that probabilities of errors of the 1st and the 2nd kinds are within allowed limits, i.e. the chances are good enough that it is the authorized user, and there is little likelihood that it is a wrongdoer. In this case, the decision of letting a user in is made.
2. The values of the parameters deviate from those set in teaching to the extent that the decision of the attempt of an unauthorized access is made.
3. The values of the parameters are in the limits that do not allow making the decisions of the 1st and the 2nd type. In such a case, the decision of analyzing a subsequent group of parameters or of generating a repeated request to the user (for specifying the parameter values) is taken. This procedure will continue until calculated probabilities of the errors of the 1st or the 2nd kind do not fall into the limits that allow making the decisions of the 1st or the 2nd type.

The output of the extractor 104 is connected also to a subsystem 112 for recognizing service passwords and control commands (voice messages). The subsystem 112 functions using the principles similar to the above ones of the subsystem 110. It makes use of procedures close to those of the speaker-independent type for control command recognition, and the speaker-dependent type for service password recognition.

Using text-independent and text-dependent parameters, the user's personality verification subsystem 110 shapes in the course of teaching an authorized user's voice pattern, establishes in the course of verification whether a speaking person is an authorized user, and generates a corresponding signal for an control unit 114. In the process of teaching, the service password and control command recognition subsystem 112 shapes patterns of the above-mentioned voice messages, the service password patterns being speaker-dependent and the control command patterns being speaker-independent. In recognition, according to each recognized and stored message, be it a service password or a control command, the subsystem 112 generates control signals and directs them to the control unit 114.

The control unit 114 is connected also with a logic function memory circuit 116, an interface circuit 118, and an ignition key 120. The key 120 serves to initialize the system 100 and it is the only mechanical means controlling the system. Interaction of the control unit 114, on one hand, and the unauthorized user voice recorder 106, the subsystems 110 and 112, a voice message generator 122 that creates voice messages transmitted through a speaker 124 for advising and instructing the user, and subsystems 126 of the object, on the other hand, takes place preferably through the interface circuit 118. Meant by the subsystems 126 for the case of the object being a vehicle are power doors, power windows, windshield wipers, HVAC, passenger compartment lights, headlights, ignition, a carphone, a navigation means, etc.

In accordance with the control signals generated by the subsystems 110 and 112, and logic functions stored in the memory circuit 116, the control unit 114 controls the selection of the parameters used by the subsystems 110 and 112. Besides, it regulates shaping references (and methods of shaping the same) and parameters of recognition algorithms for the subsystems 110 and 112. The control unit also governs operational modes of the whole system, as well as its interaction with the vehicle subsystems. The logic function memory circuit 116 provides for storing the programs of the system operational modes and the above interaction. The circuit 116 outputs the stored data to the control unit 114 in accordance with a recognized service password.

In operation of the system 100 for the case of protecting a vehicle against unauthorized access and control, a voice signal from a user comes through the microphone 108 to the parameter extractors 102 and 104, the extractor 102 isolating the user's voice individual parameters independent of the linguistic structure (the contents) of an utterance, and the extractor 104 isolating the parameters dependent thereon.

The service password and control command recognition subsystem 112 forms criterion space and references based on the extracted parameters needed for service password recognition in a speaker-dependent mode and for control command recognition in a speaker-independent mode. The service passwords serve as a means for system mode changes, and they must not be accessible to unauthorized users.

The control signals generated by the user's personality verification subsystem 110 or the service password and control command recognition subsystem 112 are input to the control unit 114. Depending on the control signals, the control unit 114 reads out of the logic function memory circuit 116 the corresponding programs of a system mode selection (for verification and password recognition purposes) or generates signals for controlling actuators (not shown) of the vehicle subsystems 126 (where control commands are to be recognized). The control signals and the system mode selection programs are transmitted through the interface circuit 118 to the vehicle actuators and to units and subsystems of the system.

These actions can result in:
bringing the actuators of the vehicle subsystems 126 into operation;
changing the parameters and algorithms of the voice subsystems 110 and 112;
arranging different types of a user-system dialogue;
rewriting voice messages of unauthorized users into a ROM (not shown);
performing various modes of locking out vital subsystems of the vehicle;
turning on or off various alarm subsystems (not shown).

The extractors 102 and 104 can be special-purpose analog or digital circuits such as TMS 320 or μPD 7720 digital signal processors. The verification and recognition subsystems 110 and 112, correspondingly, as well as the control unit 114 can be Intel 186, 286, 386, or similar universal-type microcomputers. For executing the verification and recognition procedures, vehicle-borne computers can also be used. Any commercially available speech synthesizing system can be used as the voice message generator 122 though direct writing the necessary amount of voice messages into a memory is believed to be more preferable. For the unauthorized user voice recorder 106, a commercially available RAM circuit can be used, and the logic function memory circuit 116 can be a programmable (for example, EPROM) memory unit either.

Various operational modes of the system 100 initialized by the service passwords and supported by the logic functions (programs of functioning) stored in the logic function memory circuit 116 will now be discussed with references to FIGS. 2 through 9.

Figure 2:
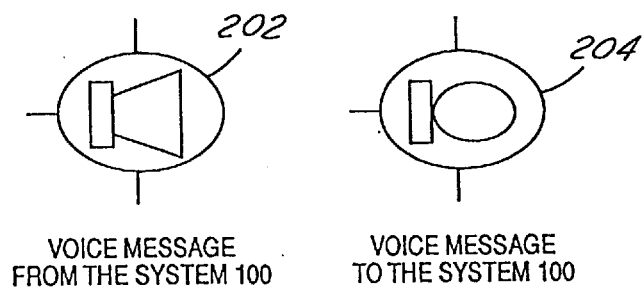
FIG. 2 is a diagram that defines the symbols utilized in the state diagrams of FIGS. 3 through 9.

In FIG. 2, there are shown definitions of the symbols utilized in the state diagrams of FIGS. 3–9. A circle 202 shown in FIG. 2 with a symbol of a speaker therein is used to define voice messages generated by the system 100. A circle 204 shown with a symbol of a microphone therein is used to define user's voice messages directed to the system.

Figure 3:
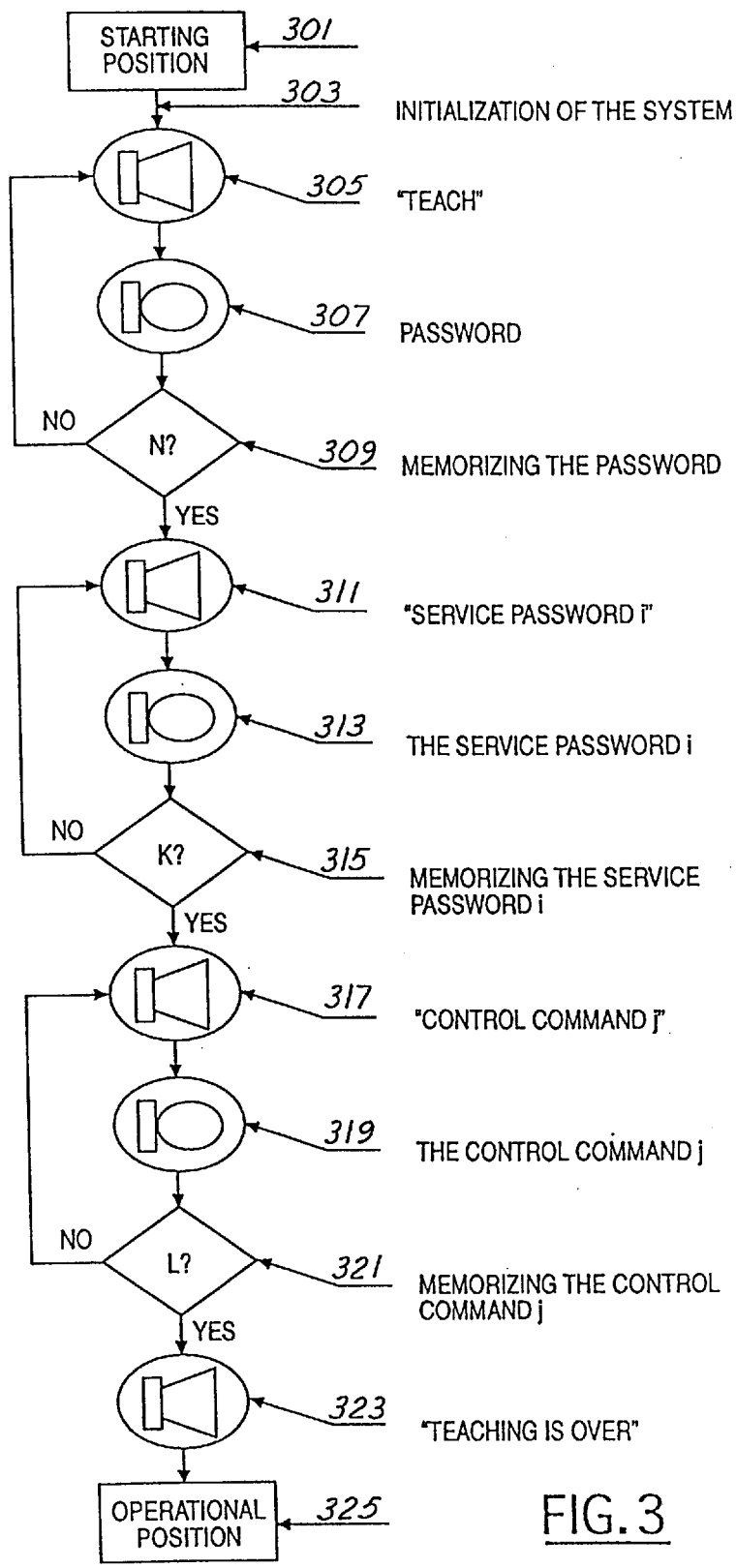
FIG. 3 is a state diagram illustrating the operation of the system of the invention in a mode of teaching the system to recognize the voice of the master user.

Referring now to FIG. 3 where a mode of teaching the system to recognize the voice of the primary authorized user (the master) is illustrated, it is appreciated that by the starting point the system has not been taught, and it is in its original state designated by an oblong 301. For the present case, the initialization of the system, that is a step 303, is performed by inserting the ignition key 120 and turning it to the driving position which is next to the last, starting position of the key. The system is ready to begin the procedure of being taught a password, service passwords and control commands.

Separation of the user's utterances into passwords, service passwords and control commands seeks to pose the respective requirements to them in terms of recognition, and to functionally separate them.

The heaviest demand is placed on the password recognition aimed at "friend-or-foe"-type identifying. It is therefore made in a stringent speaker-dependent mode. The password proper is being repeated N times to generalize it "within" the user's voice and to make further "let-friend-in-and-keep-foe-off" conclusions as highly reliable as possible. The mode of shaping the password imprint in the system constitutes a first type of shaping patterns and algorithm parameters.

The demand on a service password is less tough. The service password is aimed at setting (or resetting) the system for a specific mode of operation such as Teaching, Valet, Voice, etc., discussed in more detail below. Entering and verifying service passwords is effected in a less rigid speaker-dependent mode which does not require their repetition when teaching the system and constitutes a second type of shaping patterns and algorithm parameters.

Of even less criticality is the treating of control commands, a third type of shaping patterns and algorithm parameters. The commands ("Doors", "Windows", "Headlights", etc.) whose function is controlling vehicle subsystems are entered and verified in a speaker-independent mode and not required to be repeated.

As soon as the system is ready to begin the procedure of being taught a password, service passwords and control commands, it declares, by virtue of the voice message generator 122 and the speaker 124, in a step 305: "The system is not taught. Teaching. Say your password for verification." The user pronounces a password (a step 307), and, with the aim of verification reliability, does it N times where N preferably equals 3. The system memorizes the password in a step 309. The memorizing may be made by group averaging, or generalization that is putting an envelope on all the N samples, etc. The "No" branch 309–305 is activated where the number of the entered repetitions of the password is less than N.

Then, the system goes to the next stage of memorizing K service passwords and asks the user (in a step 311): "Pronounce a service password i" ($1 \leq i \leq k$). In a step 313, the user pronounces the corresponding service password, the system memorizes the password in a step 315, and asks for the next one of K service passwords to be entered (such as "Valet", "Voice", etc.). Among the service passwords, there can be provided a stand-by verification password performed in the speaker-independent mode. The stand-by password represents the second input into the system.

The last stage of teaching is the learning of L control commands that, similarly to that of the service passwords, takes steps 317 ("Pronounce a control command j", $1 \leq j \leq L$), 319 (entering the command), and 321 (memorizing the command).

Finally, the system advises the user in a step 323: "Teaching is over. Have a good trip." and finds itself at an operational position (an oblong 325). In that position, the system generates a signal of unlocking the vehicle subsystems, is able to receive and execute all the control commands, and also appreciate the service passwords. What will be discussed below, the system also can rearrange itself, upon the passwords being entered, in accordance with the logic functions stored in the logic function memory circuit 116. The system stays in the operational position 325 till the moment of turning the ignition key 120 off. After that, the system goes to an "off" position 401 (FIG. 4) characterizing by generating a signal for the subsystems of the vehicle to get locked.

Figure 4:
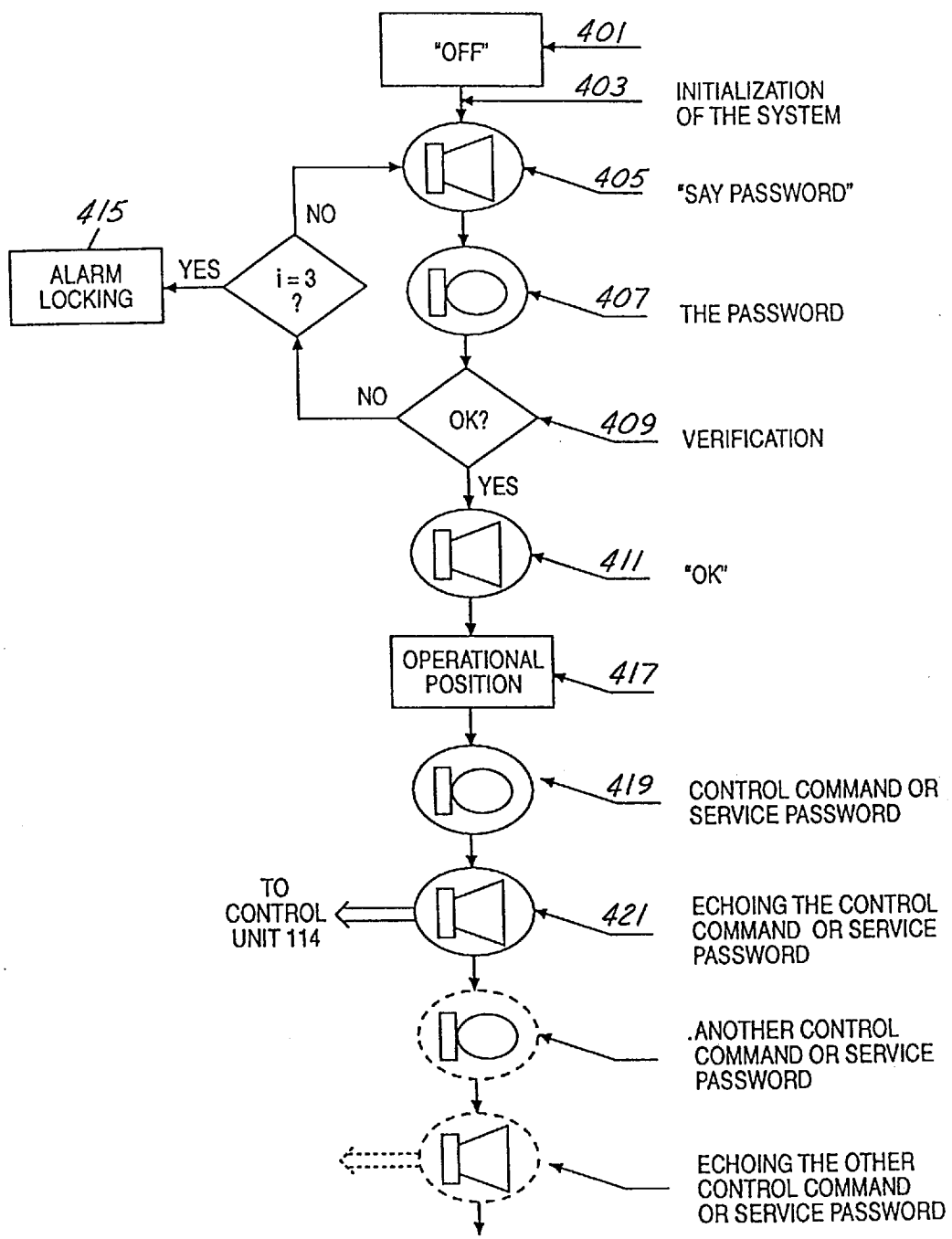
FIG. 4 is a state diagram illustrating the operation of the system of the invention in a mode of verification of the user and controlling the object subsystems.

FIG. 4 illustrates a user's verification procedure upon his getting into the car. The user is assumed to open the car with the use of a standard (issued) means. It can be, for example, a key or a remote control causing the standard (issued) security system to unlock doors and other car subsystems as the case for a specific security system model may be. Then, the user inserts the ignition key 120 and turns it to the driving position. The attempt of turning the key to the starting position will not result in starting the car since the system according to the present invention has its own means of locking the car subsystems that can only be unlocked upon the successful verification of the authorized user.

It is in the driving position of the ignition key that the system is initialized (a step 403). The system requests in a step 405: "Say your password". The user is encouraged to pronounce the password within a predetermined period of time, say five seconds (a step 407). The system carries out a verification procedure (a step 409) employing both the linguistic structure of the password (its content) and individual characteristics of the voice. If the verification completed successfully, the system wishes the verified user a good trip in a step 411 and goes to an operational position. In the event of the unfavorable result of the verification, the system provides the user in a step 413 with two more attempts. If the result is again negative, the system turns on (in a step 415) a means of warning of an attempt of an unauthorized access (a siren, flashing lights, a radio signal). In addition, it is able to turn on other alarm means such as locking doors, etc. The same result will occur if the password has not been entered within the predetermined time interval three times placed at user's disposal.

In the operational position 417, which is in essence the same as the operational position 325, the system is ready to perceive the user who utters in a step 419 an instruction in the form of a control command or a service password. The system echoes the entered instruction and generates a control signal to be transmitted to the control unit 114 (a step 421). After that, the sequence of 419–421 steps can be repeated with a different service password or control command (shown in FIG. 4 without references).

Figure 5:
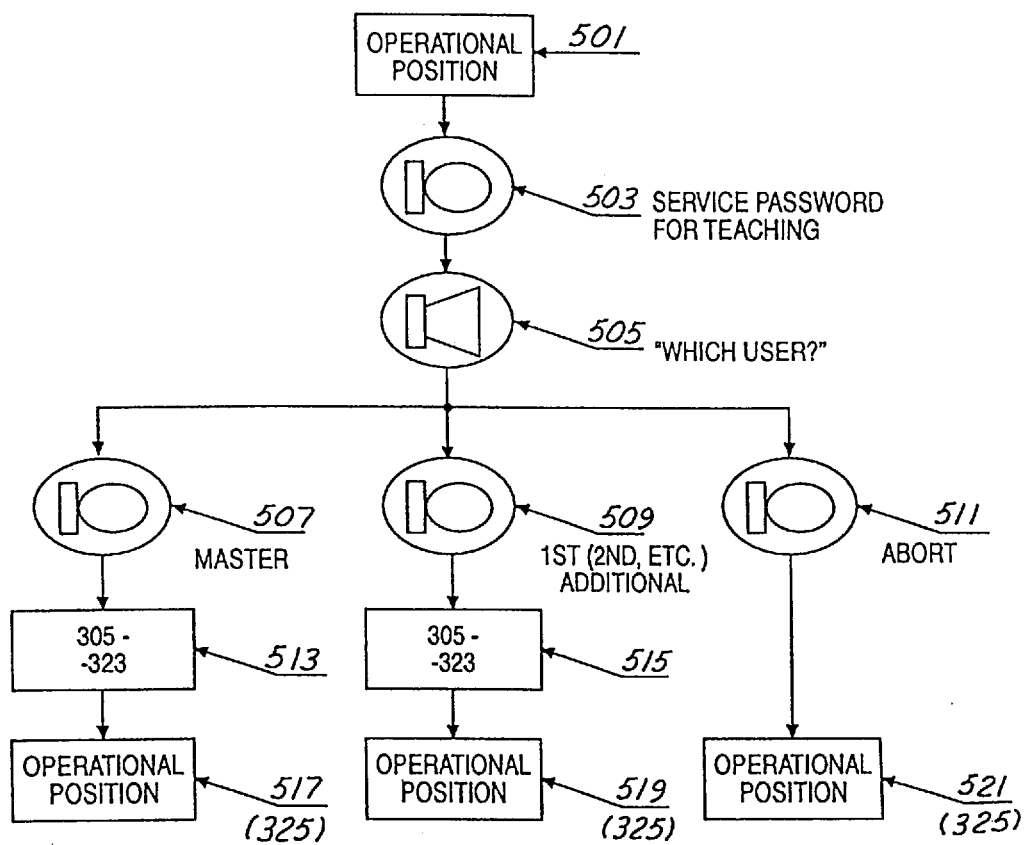
FIG. 5 is a state diagram illustrating the operation of the system of the invention in a mode of teaching the system to recognize an additional user and in a mode of re-teaching the system.

Referring now to FIG. 5 in which the mode of teaching the system the voice of more users or re-teaching it is illustrated, the initial position of the system is an operational position 501 which is the same as the position 417 in FIG. 4. The teaching procedure can be initiated by the master user only. After the service password relating to the teaching procedure stored in the memory circuit 116 has been entered in a step 503, the systems inquires in a step 505: "Which user?" Three options are possible thereafter.

The branch, starting in a step 507 with the user's answer: "The master", further follows the above-described procedure illustrated in FIG. 3 from the step 305 down to the operational position. This option may be used for re-teaching the system a new password instead of the previous one that can be assigned to an additional user, or the new password can coexist with the previous one for the master user's own purposes.

The second branch starts in a step 509 with the answer to the system: "The first additional" or "The second additional", etc. Then, the above-described procedure illustrated in FIG. 3 follows, with the only exception of entering the password for requesting the teaching procedure. The second option is used to teach the system the voice of an additional user. This option also ends up by arriving in the operational position.

The third option is the abort one. After the respective command in a step 511, the system returns to the operational position.

Figure 6:
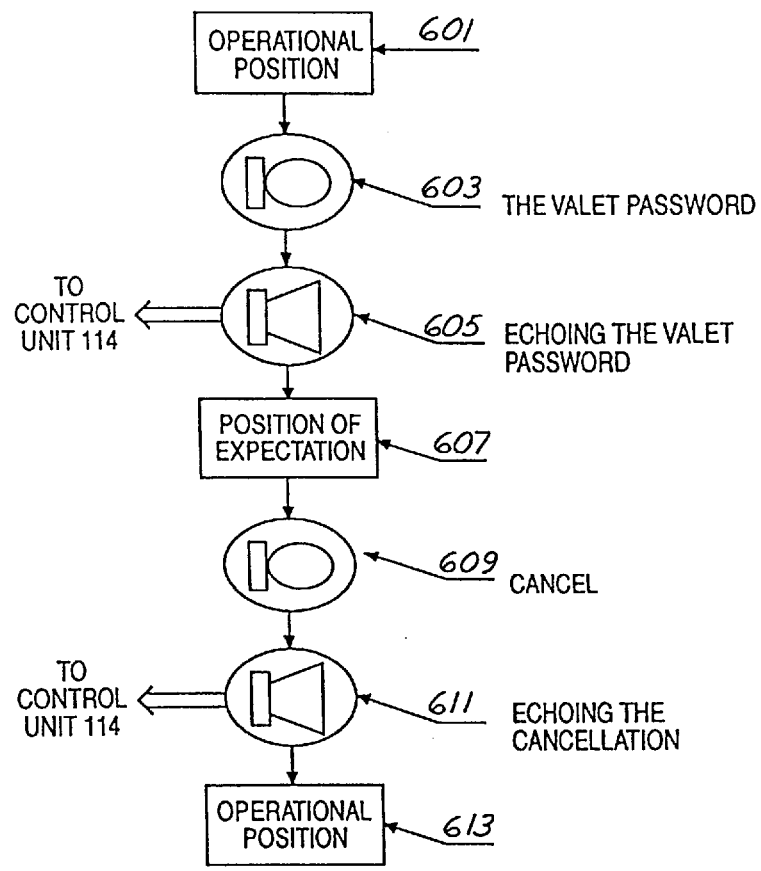
FIG. 6 is a state diagram illustrating the operation of the system of the invention where it is used for a vehicle in a valet parking mode.

FIG. 6 illustrates a "Valet" mode. The mode comes from the necessity of some practical situations where the user has to temporarily transfer driving the car to unauthorized persons. Specifically, it may take place during parking at hotels, parking lots, service stations, etc. In these instances, there is good reason to turn the system off for a while, leaving a possibility of fast turning it on. The initial position is an operational one (a step 601 that corresponds to the 417). After the user has entered (in a step 603) the password corresponding the valet procedure, the system responds adequately in a step 605, and a control signal goes to the control unit 114. It initiates the valet mode extracting a respective logic function from the logic function memory circuit 116. Controlled by this function (program), the system goes to a step 607 of expectation. All the locking of the system are off during the step 607 whatever position the ignition key 120 is in. The only password the system responds to, being in the expectation step 607, is the one canceling the valet mode. All other commands and passwords are ignored during that period. Upon the initialization made by the ignition key 120, no transfer of the system from the valet mode to any other mode ("verification", and so on) occurs until the user pronounces in a step 609 the password canceling the valet mode. Confirming the return to the operational position and outputting the respective signal to the control unit 114 in a step 611, the system then finds itself in an operational position 613 (equivalent to the 601).

Figure 7:
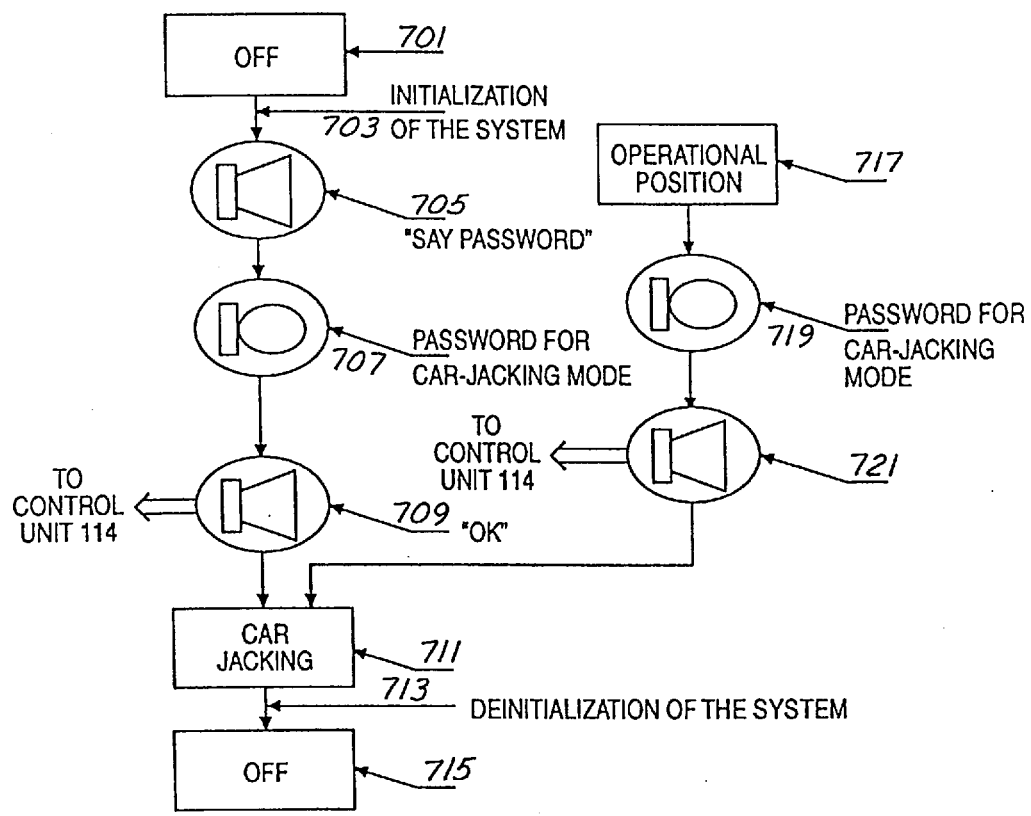
FIG. 7 is a state diagram illustrating the operation of the system of the invention where it is used for a vehicle in a car-jacking mode.

Referring now to FIG. 7, the state diagram shown in the Figure illustrates a "Car-jacking" mode. The incorporation of the mode into the system stems from the necessity of counteracting stealing a car accompanied by violence. The car capture proper may occur under different circumstances.

The first option. The engine of the car is off (a position 701, similar to the 401). With the use of threats, criminals force a user to initiate the system (using the ignition key 120, in a step 703, similar to the 403), to have the system transferred into the operational mode by means of the verification password, and (or) further into the valet mode. In that event, the user having to respond to the system's "say the password" request enters (in a step 707) the password corresponding to the car-jacking mode. A complete appearance of the system being in the operational position occurs. However, saying "have a good trip" in a step 709, the system concurrently generates the control command directed to the control unit 114. The command causes the control unit to initiate the executing of a respective "Car-jacking" logic function which is extracted from the logic function memory circuit 116. As a result, after a predetermined delay intervals, the signals of the car-jacking, such as a radio signal, light flashing, a siren, etc., are successively initiated (a step 711). Finally, the locking signal comes on. The predetermined delay interval is selected to be sufficient enough for the user to find himself/herself at a safe distance from the scene. When alarm signals come to operation, the respective car alarm systems can be activated. Their description lies beyond the scope of the present specification though it is the system according to the present invention that initiated them.

The car-jacking state is canceled by the key 120 being turned off (a step 713), and the system comes to an off position 715 (similar to the 401) where it is ready to the verification cycle. The alarm signals can be turned off by, for example, cutting off the siren power supply or with the use of some other action within the limits of the issued car security system. Though, even after canceling the alarm signals, the car can only be started by the use of the master user's voice.

The second option. The engine is running. The system is in the operational position (a step 717). Being under threat, the user has to leave the car. If he/she is able (in a step 719, similar to the 707) to pronounce the password corresponding to initiating the car-jacking mode, the system does not respond and goes to the step 711, and the above first option is copied from that step on. If the user manages to turn the ignition key off, the whole procedure of the above first option can be faithfully copied.

Figure 8:
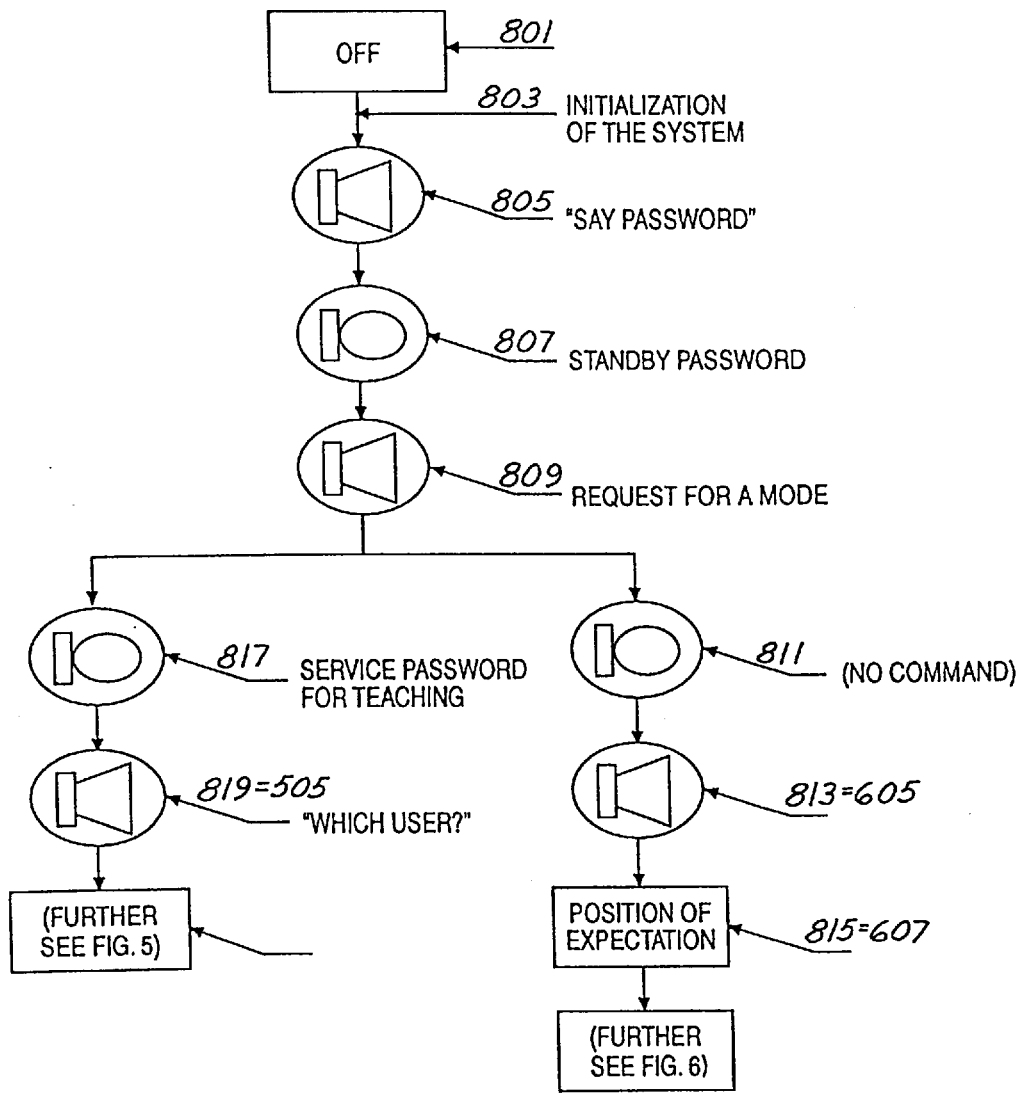
FIG. 8 is a state diagram illustrating the operation of the system of the invention in a mode of teaching the system to recognize the master user in case of a change of his (her) voice.

FIG. 8 depicts the state diagram corresponding to a "Voice" mode that can be initiated by the user in the event where his/her voice has suffered a substantial change as a result of sickness or a different psychophysiological state. The system is off (a step 801, similar to 401). After initializing the system (in a step 803, a copy of the 403), it requests: "say a password" (a step 805, similar to the 405), and the user pronounces (in a step 807) an easily utterable standby password. The references for the standby password are previously formed in the speaker-independent mode. Patterns of the "easily utterable password" can be formed in both speaker-independent and speaker-dependent modes. This provides an additional protection against possible mimicking the password, if it got known to a wrongdoer in some way. In case of any doubts arising during the user's identification, the procedure of re-requesting the password is to be performed. In case of this password being entered under the threat, the system can be supplied with an additional subsystem of recognizing an emotional stress (not shown). Methods of determining an emotional state by voice are known in the art (see, for example, USSR Authors' Certificate No. 793575 issued to V. I. Galoonov et al. for "Apparatus for determining emotional state change using a speech signal"). In this case, the system will again go to the state 805 ("Say your password") instead of going to a state 809 (selection of a mode), and if the password is attempted to be entered once more (that should not be the case according to the "Voice" mode performance), the car-jacking mode is getting on.

If there are no above-described problems, the system readily recognizes the password and requests for the mode in the step 809. Two options are available now.

If during a predetermined interval (as for five seconds) no commands have been entered, the system transfers to the valet mode (a step 813, similar to the 605), to the expectation step 815 therein (similar to 607), and further on.

In case of entering (in a step 817) the password corresponding to the mode of teaching, the system responds in a step 819 with the question: "Which user?" (similar to the 505), and the mode of teaching (actually re-teaching) the system a new (a changed) voice can be pursued. This mode is much in common to the procedure illustrated in FIG. 5.

As an alternative, a sound signal other than a voice signal can be entered as the standby password in the "Voice" mode. There is a variety of signals that can be used for this purpose—from a specific set of frequencies produced by a touch-tone-type generator used in touch-tone telephone devices up to the sound of watch ticking. Two general requirements are placed upon the sound signal of this kind. Firstly, it should be specific enough to be sufficiently distinguishable. Secondly, it should be kept in secret.

Figure 9:
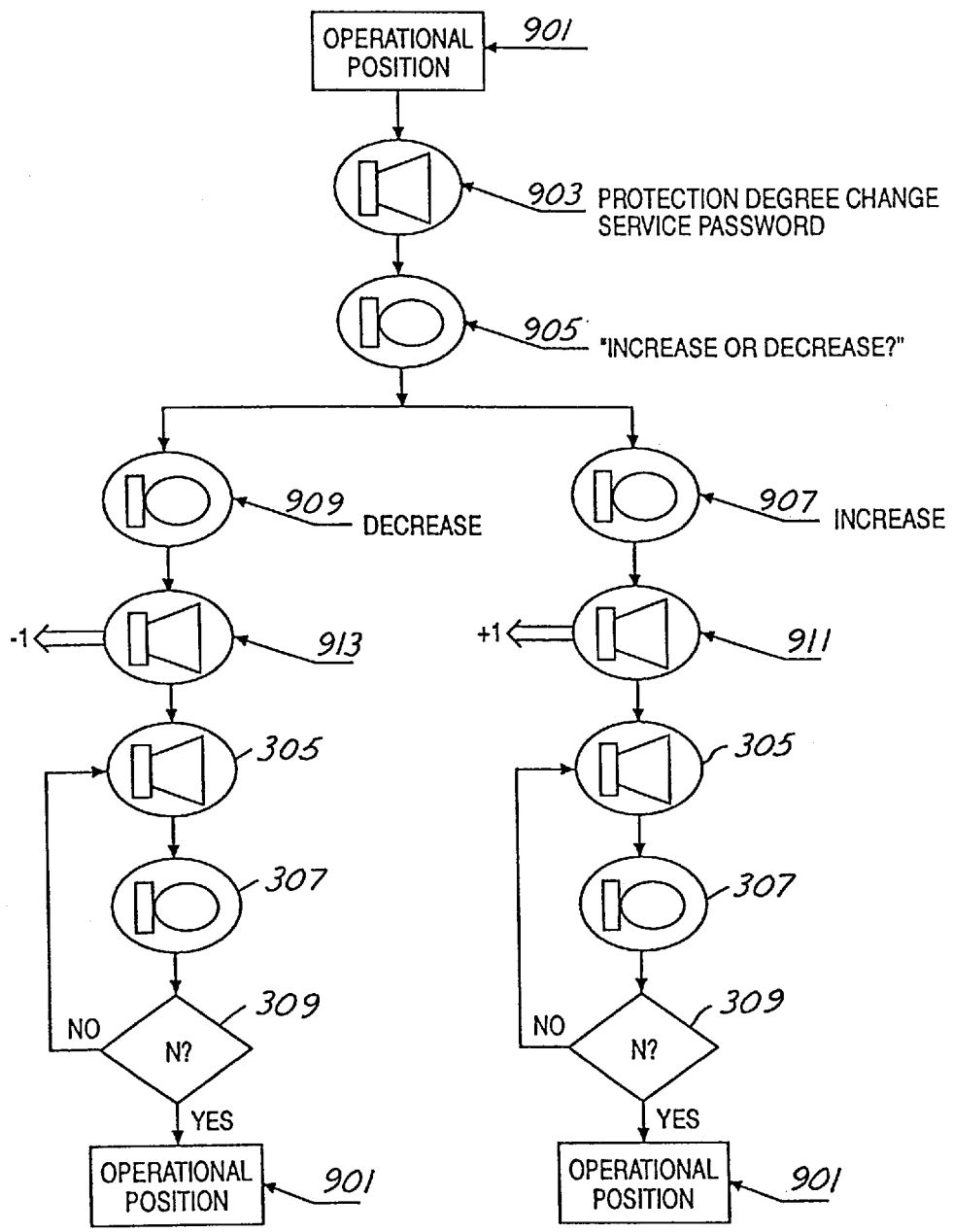
FIG. 9 is a state diagram illustrating the operation of the system of the invention in a mode of changing the degree of protection of the object.

Referring finally to FIG. 9, one more mode of operation of the system residing in changing the vehicle protection degree is illustrated. The idea forming the basis for the protection degree is the extent of tension of a protection envelope stretched over a user's voice message (a password, or service password, or a control command). The more intimate mating of the envelope and the voice message exists, the less the probability that the authorized user's message will be mimicked that is of primary importance for the password. The initial setting of the system establishing a degree of protection is oriented to a statistically-mean user. At the same time, there may be cases where a different protection degree is necessary dictated by various speech capabilities of users and various levels of the requirements imposed by them on car protectiveness attained by means of the present system. The mode varies a decision-making threshold changing, for example, one of the constants of the verification algorithm.

With the system being in an operational position (a step 901, similar to the 417), the execution of the mode begins through entering (in a step 903) a service password corresponding to the protection degree change. The system responds with a question: "Protection degree. To increase or to decrease?" After the respective command (a step 907 for "increase" or a step 909 for "decrease") has been uttered by the user, the system changes the protection degree by one step in the direction of increase or decrease by transmitting a control signal to the control unit 114 in a step 911 or 913, correspondingly. The procedure, similar to that shown in FIG. 3 (the steps 305, 307, 309), of re-teaching the system to communicate with the given user using the new protection degree then follows. The re-teaching ends up with the return of the system to the operational position.

The set of the modes prescribed by logic functions may vary at user's will in the direction of expanding or reducing the list thereof. So in much the same way, more modes can be illustrated such as recording and playing back the voice of an unauthorized user on attempted intruding the car or on car-jacking (talks in the passenger compartment).

While several embodiments of the present invention have been disclosed hereinabove, it is to be understood that these embodiments are given by example only and not in a limiting sense. Those skilled in the art may make various modifications and additions to the preferred embodiments chosen to illustrate the invention without departing from the spirit and scope of the present contribution to the art. Accordingly, it is to be realized that the patent protection sought and to be afforded hereby shall be deemed to extend to the subject matter claimed and all equivalence thereof fairly within the scope of the invention.

We claim:

1. A method of protecting a vehicle from unauthorized access using a multimode system incorporated in said vehicle; said vehicle having warning and locking means and actuators; said system comprising a microphone responsive to a voice of a user, a means for generating voice message intended for said user, a user's personality voice verification means, a voice message recognition means, a logic function memory means, a control means, and an initiating means; said method comprising the steps of:

I. teaching said system a voice password, voice service passwords and control commands in advance by
   (a) initializing said system by said initiating means,
   (b) interactively entering a voice password, voice service passwords and control commands into said system, said voice service passwords including a voice changing mode service password,
   (c) analyzing said voice password, said voice service passwords and said control commands in a text-dependent and a text-independent mode, respectively, by said user's personality voice verification means and said voice message recognition means controlled by said control means, and
   (d) storing said voice password, said voice service passwords and said control commands in said logic function memory means;
 II. teaching said system said voice password, voice service passwords and control commands in said voice changing mode by
   (e) entering said voice changing mode service password into said system,
   (f) interactively entering said voice password, voice service passwords and control commands into said system in said voice changing mode,
   (g) analyzing said entered in step (f) voice password, voice service passwords and control commands in a text-dependent and a text-independent mode, respectively, by said user's personality voice verification means and said voice message recognition means controlled by said control means,
   (h) storing said analyzed in step (g) voice password, said voice service passwords and said control commands in said logic function memory means, to thereby allow said user whose voice has suffered a substantial change as a result of sickness or a different psychophysiological state to operate said system, and
 III. transferring said system into an operational state.

2. The method of protecting a vehicle as claimed in claim 1, wherein said voice changing made service password is a predetermined voice signal.

3. The method of protecting a vehicle as claimed in claim 1, wherein said voice changing mode service password is a predetermined sound signal other than voice.

4. A method of protecting a vehicle from unauthorized access using a multimode system incorporated in said vehicle; said vehicle having warning and locking means and actuators; said system comprising a microphone responsive to a voice of a user, a means for generating voice message intended for said user, a user's personality voice verification means, a voice message recognition means, a logic function memory means, a control means, and an initiating means; said method comprising the steps of:

I. teaching said system a voice password, voice service passwords and control commands in advance by
  (a) initializing said system by said initiating means,
  (b) interactively entering a voice password, voice service passwords and control commands into said system, said voice service passwords including a voice service password for changing a system protection degree,
  (c) analyzing said voice password, said voice service passwords and said control commands in a text-dependent and a text-independent mode, respectively, by said user's personality voice verification means and said voice message recognition means controlled by said control means, and
  (d) storing said voice password, said voice service passwords and said control commands in said logic function memory means;

II. affecting the system protection degree by
  (e) interactively entering said protection degree service password to change the system protection degree;

III. teaching said system said voice password, voice service passwords and control commands at said changed system protection degree by
  (f) interactively entering said voice password, voice service passwords and control commands into said system,
  (g) analyzing said entered in step (f) voice password, voice service passwords and control commands in a text-dependent and a text-independent mode, respectively, by said user's personality voice verification means and said voice message recognition means controlled by said control means,
  (h) storing said analyzed in step (g) voice password, said voice service passwords and said control commands in said logic function memory means; and IV. transferring said system into an operational state.

* * * * *